(No Model.)
W. WOOD.
ROCK DRILL.
No. 582,109. Patented May 4, 1897.
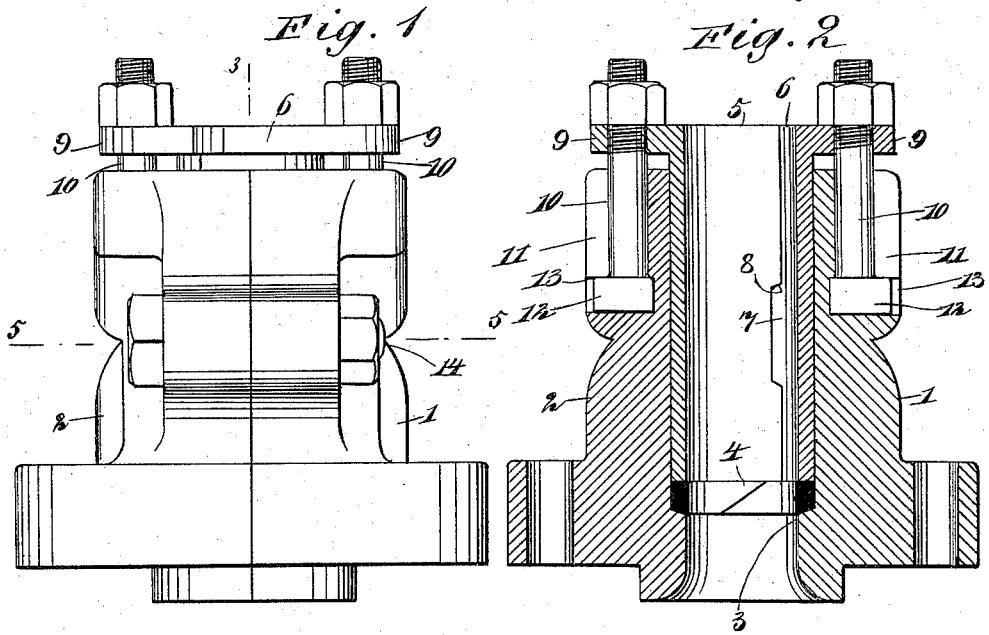
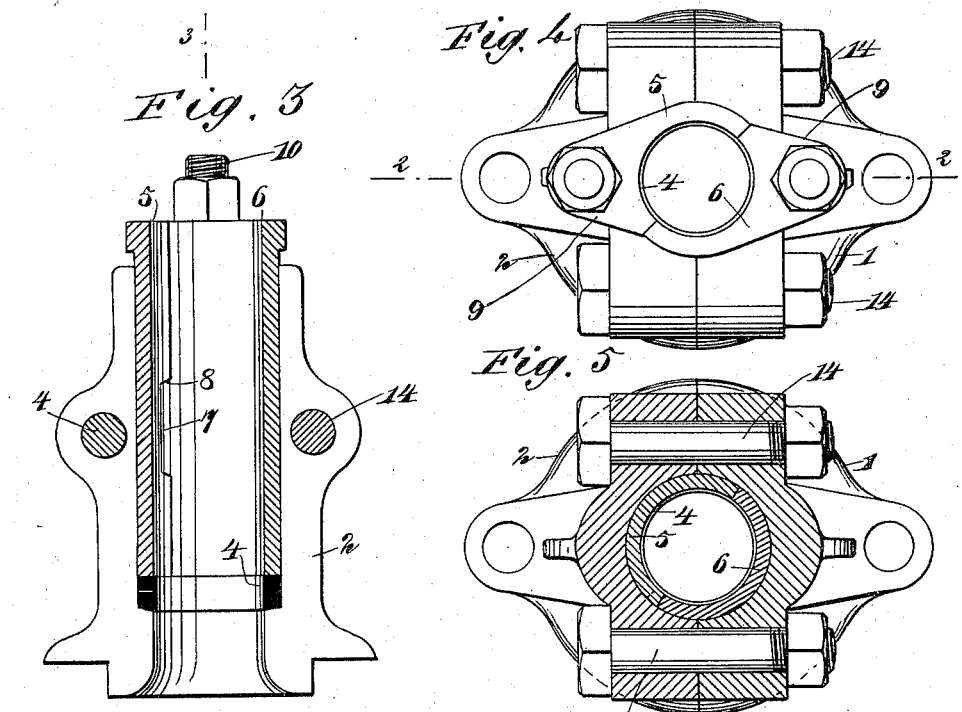
WITNESSES:
C. Neveux
C. R. Ferguson
INVENTOR
W. Wood.
BY
ATTORNEYS.

UNITED STATES PATENT OFFICE.

WARREN WOOD, OF PATERSON, NEW JERSEY, ASSIGNOR TO THE McKIERNAN DRILL COMPANY, OF SAME PLACE.

ROCK-DRILL.

SPECIFICATION forming part of Letters Patent No. 582,109, dated May 4, 1897.

Application filed May 29, 1896. Serial No. 593,573. (No model.)

*To all whom it may concern:*

Be it known that I, WARREN WOOD, of Paterson, in the county of Passaic and State of New Jersey, have invented a new and Improved Rock-Drill Head, of which the following is a full, clear, and exact description.

This invention relates to heads for rock-drill cylinders through which the piston or drill rod passes.

In rock-drilling the drill is often placed at an acute angle, or in such a position as to drill a hole at an acute angle in the rock, and in this operation the drill is deflected laterally with relation to the head, which results in the wearing away or enlarging of the opening through the head at the outer end, where the stuffing box or gland is usually placed, thus allowing the escape of steam or other motive agent, and consequently a new stuffing box or gland must be provided in a very short time. The object of my invention is to overcome this difficulty as far as it relates to the escape of the motive agent, and, further, to prolong the usefulness of the drill-head.

I will describe a drill-head embodying my invention and then point out the novel features in the appended claim.

Reference is to be had to the accompanying drawings, forming a part of this specification, in which similar characters of reference indicate corresponding parts in all the views.

Figure 1 is a side elevation of a rock-drill head embodying my invention. Fig. 2 is a section thereof on the line 2 2 of Fig. 4. Fig. 3 is a section on the line 3 3 of Fig. 1. Fig. 4 is a top end view, and Fig. 5 is a section on the line 5 5 of Fig. 1.

The drill-head comprises a casing made in two separable sections 1 2, having at the lower ends outwardly-extended perforated lugs through which bolts may pass to secure the head to the drill-cylinder. These sections of the casing are secured together by means of transverse bolts 14.

Arranged within the bore of the casing is a bearing-sleeve consisting of two longitudinally-separated sections 5 and 6. One edge of each section is provided with a projection 7, adapted to engage in a recess 8 of the other section, and thus prevent a longitudinal displacement of one section relatively to the other when the parts are in position within the casing. It will be seen that the joints between the sections of the parts 5 and 6 are arranged out of line of the joints between the parts 1 and 2. Such construction will prevent the escape through the joints of any portion of the motive agent.

The inner end of the sleeve formed by the two sections rests upon the packing 4, and the outer end of each section 5 and 6 is provided with a laterally-extended lug 9, provided with a perforation through which a tie-bolt 10 passes. These tie-bolts have their shank portions engaged in outwardly-opening recesses 11, formed in the opposite sections of the casing, and the heads 12 of the bolts engage the outwardly-opening recesses 13 at the base of the recesses 11. The said recesses 13 being undercut or projected beyond the walls of the recesses 11, it will be seen that the bolts may be inserted laterally, and then after placing the sleeve in position said sleeve may be forced tightly against the steam-packing 4 by means of the nuts on the outer ends of the bolts.

It will be seen by this construction, in which the steam-packing is placed at the base of the head or close to its connection with the steam-cylinder, that any lateral pressure that may be brought to bear upon a drill-rod or piston-rod through the sleeve will have no perceptible effect on the packing, and it is obvious that any wear that may be imparted at the outer end of said sleeve by the lateral deflection of the rod will have no effect such as to allow the escape of any portion of the motive agent.

Having thus described my invention, I claim as new and desire to secure by Letters Patent—

A rock-drill head comprising a casing, a bearing-sleeve therein, a packing-ring on which the inner end of the ring engages, bolts for securing the sleeve to the casing, the said bolts having their shank portions engaged in outwardly-opening recesses formed in opposite sides of the casing, the heads of said bolts engaging in undercut outwardly-opening recesses at the base of the first-named recesses, the said bolts passing through openings in lugs extended from the sleeve and nuts on the bolts bearing upon the outer surfaces of the sleeve-lugs, whereby the sleeve may be drawn off the bolts after removing the nuts, substantially as specified.

WARREN WOOD.

Witnesses:
SAMUEL G. McKIERNAN,
JOHN H. GOETSCHINS.